(12) United States Patent
Dhruna et al.

(10) Patent No.: US 11,433,844 B2
(45) Date of Patent: Sep. 6, 2022

(54) BRACKET FOR A PILLAR ASSEMBLY

(71) Applicant: Ford Global Technologies, LLC, Dearborn, MI (US)

(72) Inventors: Beatriz Arredondo Dhruna, Canton, MI (US); Alexandra Margaret Rose, Windsor (CA); Amit Chakravarty, Warren, MI (US); Luis Alberto Durán Hernández, Coyoacan (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/076,124

(22) Filed: Oct. 21, 2020

(65) Prior Publication Data
US 2022/0118935 A1    Apr. 21, 2022

(51) Int. Cl.
| | |
|---|---|
| *B60R 21/213* | (2011.01) |
| *B60R 21/232* | (2011.01) |
| *B60R 13/02* | (2006.01) |
| *B60R 11/00* | (2006.01) |
| *B60R 16/02* | (2006.01) |
| *B62D 25/04* | (2006.01) |
| *H02G 3/00* | (2006.01) |

(52) U.S. Cl.
CPC ......... *B60R 21/213* (2013.01); *B60R 13/025* (2013.01); *B60R 13/0206* (2013.01); *B60R 13/0212* (2013.01); *B60R 11/00* (2013.01); *B60R 16/0215* (2013.01); *B60R 21/232* (2013.01); *B62D 25/04* (2013.01); *H02G 3/26* (2013.01)

(58) Field of Classification Search
CPC . B60R 21/213; B60R 21/232; B60R 13/0206; B60R 16/0215; B60R 11/00; B62D 25/04; Y10T 24/47; Y10T 24/4764; F16L 3/227; H02G 3/26; H02G 3/00; H02G 3/0437
USPC ....... 296/187.01, 214; 248/205.1; 280/728.2, 280/730.2; 174/72 A
See application file for complete search history.

(56) References Cited

U.S. PATENT DOCUMENTS

| | | | |
|---|---|---|---|
| 6,378,811 B1 * | 4/2002 | Potter | ...................... H02G 3/30 248/65 |
| 7,291,785 B2 | 11/2007 | Riester et al. | |
| 7,815,252 B2 * | 10/2010 | Huelke | .................. B60R 13/07 296/213 |

(Continued)

FOREIGN PATENT DOCUMENTS

| | | | | |
|---|---|---|---|---|
| DE | 102009014475 A1 | | 9/2010 | |
| WO | WO-0121442 A1 * | | 3/2001 | ......... B60R 16/0215 |

OTHER PUBLICATIONS

Hilmar, "Device for Fixing a Functional Element to a Motor Vehicle Body", Mar. 29, 2001, Edition: WO0121442A1 (Year: 2001).*

*Primary Examiner* — Dennis H Pedder
*Assistant Examiner* — Joyce Eileen Hill
(74) *Attorney, Agent, or Firm* — Vichit Chea; Price Heneveld LLP (57) ABSTRACT

A bracket for a vehicle pillar includes a panel that has a face that is defined by an upper edge and a lower edge. An attachment tab is coupled to and outwardly extends from the panel. Upper retention features are coupled to the panel. Lower retention features are coupled to the panel and are adjacent to the attachment tab. Each of the upper retention features and each of the lower retention features define an annular recess.

19 Claims, 8 Drawing Sheets

(56) References Cited

U.S. PATENT DOCUMENTS

2005/0046154 A1 3/2005 Rhea et al.
2008/0284141 A1 11/2008 Jang et al.
2009/0184494 A1* 7/2009 Dominissini ......... B60R 21/217
　　　　　　　　　　　　　　　　　　　　　280/728.2

* cited by examiner

BRACKET FOR A PILLAR ASSEMBLY

FIELD OF THE DISCLOSURE

The present disclosure generally relates to a pillar assembly for a vehicle. More specifically, the present disclosure relates to a bracket for a pillar assembly for a vehicle.

BACKGROUND OF THE DISCLOSURE

Vehicles have pillars that support the structural framework of the vehicle. Vehicles also have electrical components that are connected to power sources via wiring that runs through the pillars. The wiring is typically covered by trim panels that are attached to the pillars.

SUMMARY OF THE DISCLOSURE

According to a first aspect of the present disclosure, a pillar assembly includes a pillar frame. At least one trim bracket is coupled to the pillar frame. The at least one trim bracket includes a fastening feature. A bracket panel is coupled to the pillar frame and is disposed proximate to the at least one trim bracket. An attachment tab defines an aperture and is coupled to the bracket panel. Upper retention features are coupled to the bracket panel. Each upper retention feature includes a first retention feature and a second retention feature. Lower retention features are coupled to the bracket panel and are adjacent to the attachment tab. The upper retention features and the lower retention features define annular recesses.

Embodiments of the first aspect of the disclosure can include any one or a combination of the following features:
- the first retention feature defines a first annular recess and the second retention feature defines a second annular recess;
- the annular recesses of the lower retention features have a diameter that is greater than a diameter of the annular recesses of the upper retention features;
- a fastener is disposed within the aperture of the attachment tab and is coupled to the attachment tab;
- an inflatable curtain is operably coupled to the fastener and is selectively disposed in a storage position;
- a diameter of the second retention feature of the upper retention feature is greater than a diameter of the first retention feature of the upper retention feature;
- the first retention features and the second retention features of the upper retention feature are integrally formed; and
- the bracket panel has an upper edge and a lower edge, wherein the upper retention features are coupled to the upper edge and the lower retention features are coupled to the lower edge.

According to a second aspect of the present disclosure, a bracket for a vehicle pillar includes a panel that has a face that is defined by an upper edge and a lower edge. An attachment tab is coupled to and outwardly extends from the panel. Upper retention features are coupled to the panel. Lower retention features are coupled to the panel and are adjacent to the attachment tab. Each of the upper retention features and each of the lower retention features define an annular recess.

Embodiments of the second aspect of the disclosure can include any one or a combination of the following features:
- each of the upper retention features includes a first retention feature and a second retention feature;
- the first retention feature defines a first annular recess and the second retention feature defines a second annular recess;
- the second annular recess has a diameter that is greater than a diameter of the first annular recess;
- the upper retention features outwardly extend from the face of the panel proximate to the upper edge of the panel;
- each of the lower retention features includes a planar engagement surface;
- each of the lower retention features defines an annular recess; and
- the upper retention features outwardly extend from the upper edge of the panel, wherein the lower retention features outwardly extend from the lower edge of the panel.

According to a third aspect of the present disclosure, a vehicle pillar bracket includes a bracket panel that has a face at least partially defined by an upper edge and a lower edge of the bracket panel. Upper retention features are coupled to the bracket panel. Each upper retention feature includes a first retention feature and a second retention feature. Lower retention features are coupled to the bracket panel. Each of the upper retention features and each of the lower retention features defines an annular recess.

Embodiments of the third aspect of the disclosure can include any one or a combination of the following features:
- the upper retention features and the lower retention features are integrally formed with the bracket panel;
- the upper retention features outwardly extend from the face of the bracket panel;
- the lower retention features outwardly extend from the lower edge of the bracket panel; and
- a diameter of the lower retention features is greater than a diameter of the upper retention features.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Additional features and advantages of the presently disclosed device will be set forth in the detailed description which follows and will be apparent to those skilled in the art from the description, or recognized by practicing the device as described in the following description, together with the claims and appended drawings.

Figure 1:
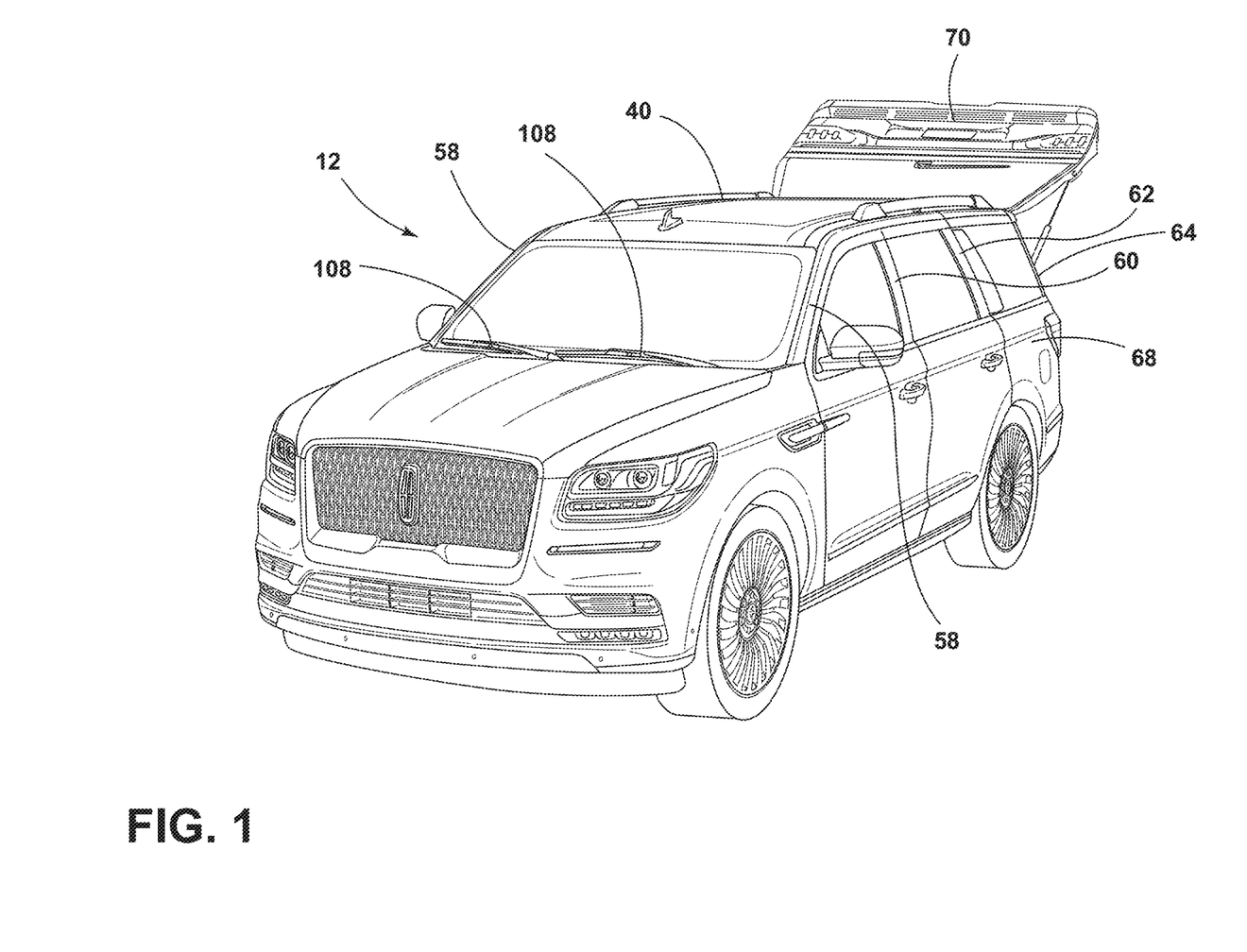
FIG. 1 is a front perspective view of a vehicle of the present disclosure.
Figure 2:
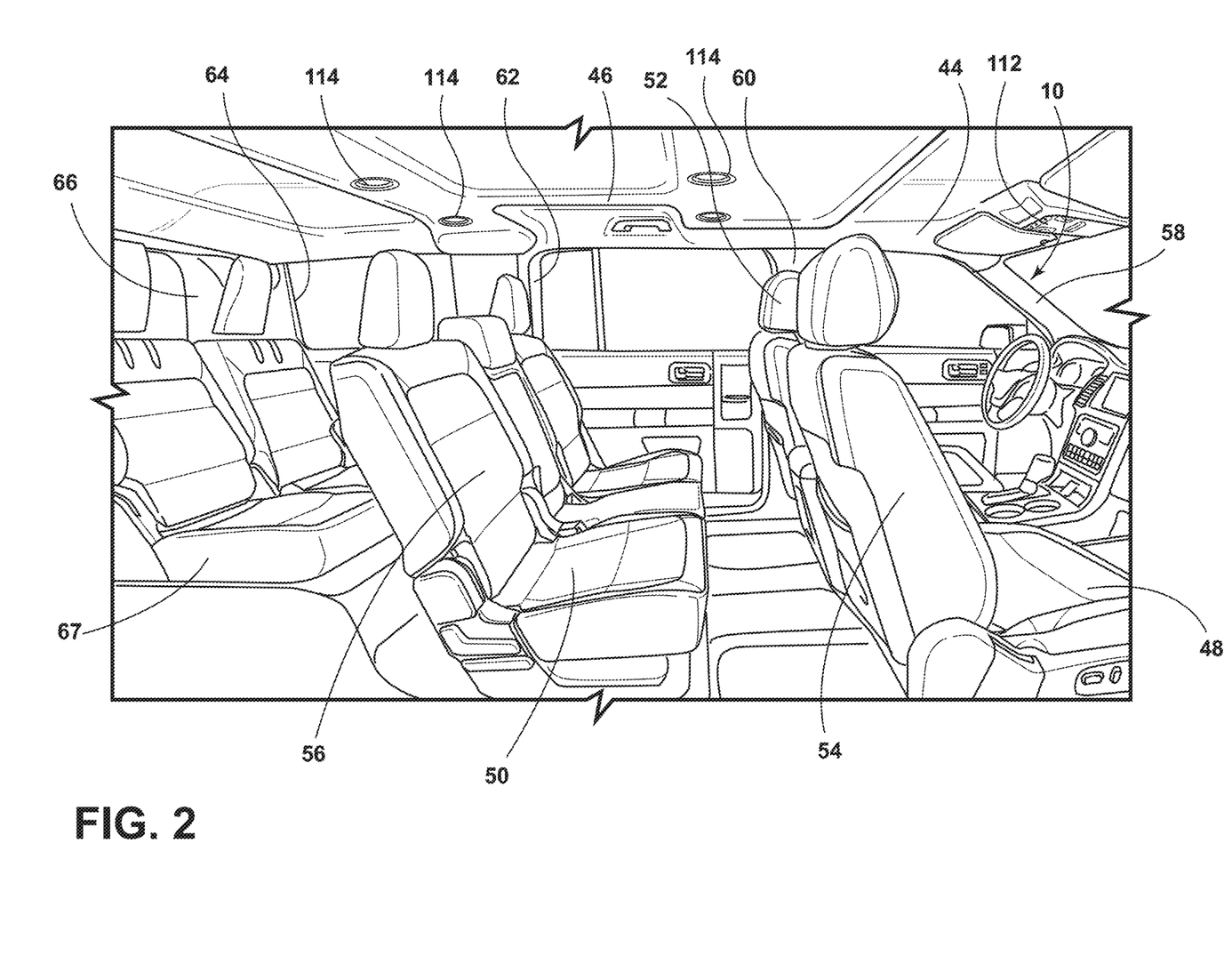
FIG. 2 is a partial side perspective view of an interior of a vehicle of the present disclosure.

For purposes of description herein, the terms "upper," "lower," "right," "left," "rear," "front," "vertical," "horizontal," "interior," "exterior," and derivatives thereof shall relate to the disclosure as oriented in FIG. 1. However, it is to be understood that the disclosure may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-8, reference number 10 generally refers to a pillar assembly for a vehicle 12 including a pillar frame 14. At least one trim bracket 16 is coupled to the pillar frame 14 and includes a fastening feature 18. A bracket panel 20 is coupled to the pillar frame 14 and is disposed proximate to the at least one trim bracket 16. An attachment tab 22 defines an aperture 24 and is coupled to the bracket panel 20, and upper retention features 26 are coupled to the bracket panel 20. Each upper retention feature 26 includes a first retention feature 28 and a second retention feature 30. Lower retention features 32 are coupled to the bracket panel 20 adjacent to the attachment tab 22. The upper retention features 26 and the lower retention features 32 define annular recesses 34.

Referring now to FIGS. 1-4, the vehicle 12 includes a vehicle body 40 that defines an interior 44 of the vehicle 12 having a passenger compartment 46 therein. The passenger compartment 46 may include a first seating row 48 and a second seating row 50. Fewer or more seating rows may be included in the vehicle 12, without departing from the teachings herein. The first seating row 48 may include a driver seat 52 and a passenger seat 54, and the second seating row 50 may include rear passenger seats 56. The rear passenger seats 56 of the second seating row 50 may include bucket seating or may be bench seating.

In various examples, the vehicle 12 is a wheeled motor vehicle 12, which may be a sedan, a sport utility vehicle, a truck, a van, a crossover, and/or other styles of vehicle. The vehicle 12 may be a manually operated vehicle (e.g., with a human driver), a fully autonomous vehicle (e.g., no human driver), or a partially autonomous vehicle (e.g., may be operated with or without a human driver). Additionally, the vehicle 12 may be utilized for personal and/or commercial purposes, such as ride-providing services (e.g., chauffeuring) and/or ride-sharing services.

The vehicle body 40 includes an A-pillar 58 proximate to each of the driver seat 52 and the passenger seat 54. The vehicle body 40 may also include a B-pillar 60, a C-pillar 62, and a D-pillar 64. The B-pillar 60 is typically positioned between the first seating row 48 and the second seating row 50, and the C-pillar 62 is positioned proximate to the second seating row 50. In some vehicle configurations, the C-pillar 62 may be positioned between the second seating row 50 and a cargo space 66 of the vehicle 12. The D-pillar 64 is typically utilized in larger vehicles, such as sport utility vehicles, such that the cargo space 66 may be generally accessible from the second seating row 50. Additionally or alternatively, the vehicle 12 may include a third seating row 67, which may be positioned proximate to the cargo space 66 and the D-pillar 64. Typically, the D-pillar 64 may be positioned at a rear 68 of the vehicle 12 proximate to a cargo door 70. It is generally contemplated that the pillar assembly 10 described herein may be utilized for any one of the A-pillar 58, the B-pillar 60, the C-pillar 62, or the D-pillar 64. For purposes of this disclosure, the pillar assembly 10 will be described in relation to the A-pillar 58.

Figure 3:
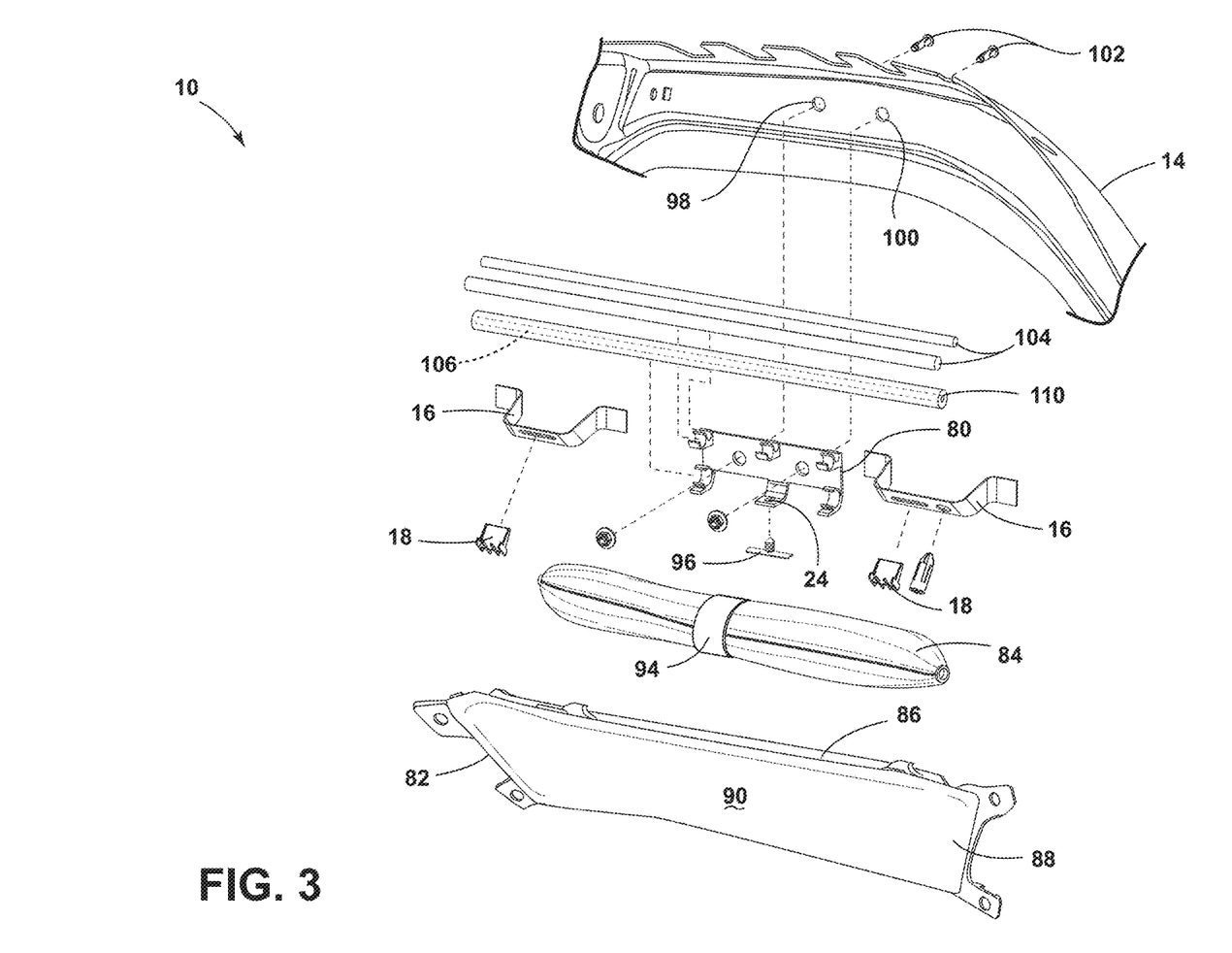
FIG. 3 is an exploded side perspective view of a panel assembly of the present disclosure.
Figure 4:
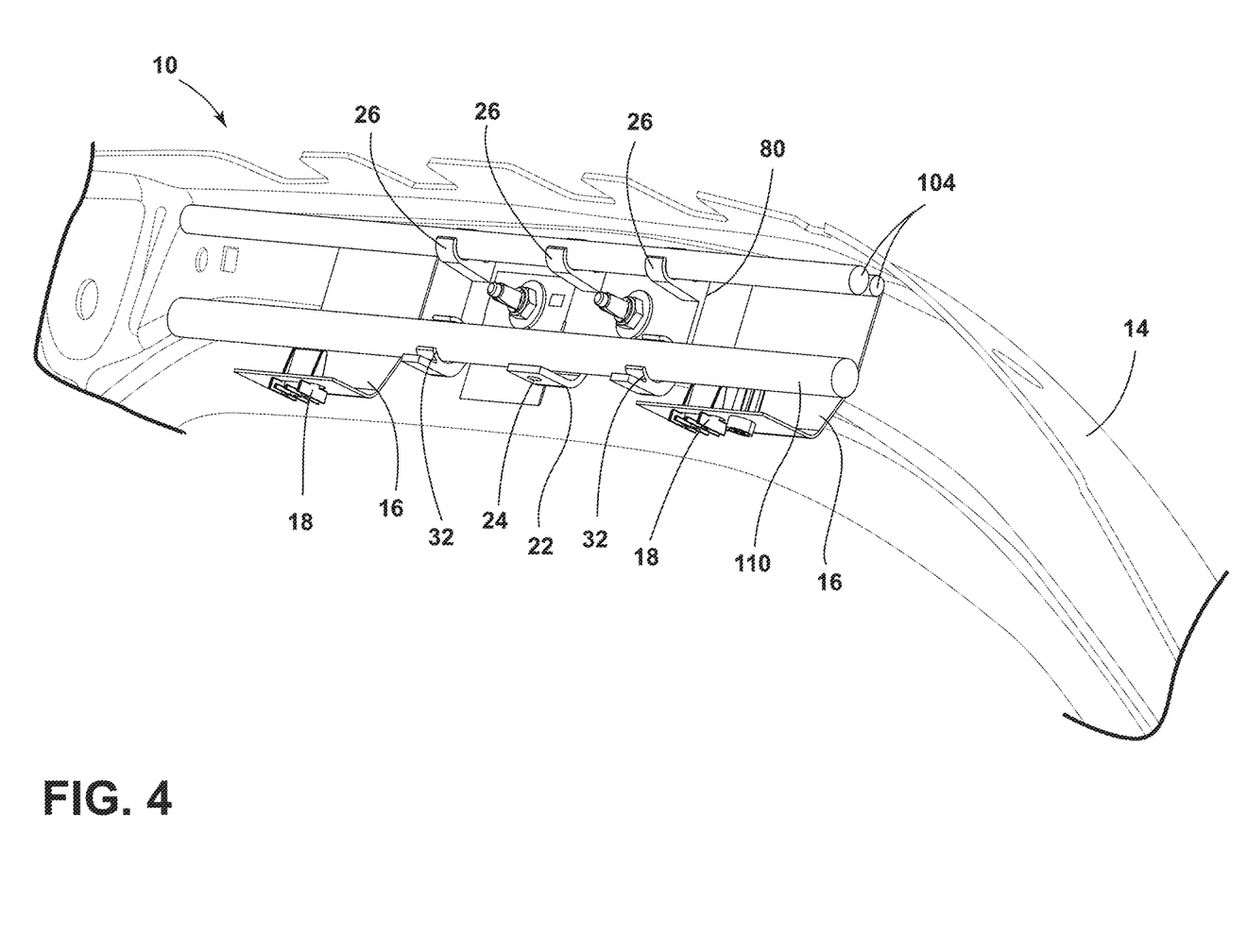
FIG. 4 is a partial expanded side perspective view of a bracket of the present disclosure operably coupled to hoses and an insulated tube.

Referring to FIGS. 3 and 4 and as mentioned above, the pillar assembly 10 includes the pillar frame 14, at least one trim bracket 16, and a bracket 80. It is generally contemplated that the bracket 80 includes the bracket panel 20, the upper retention features 26, and the lower retention features 32, as will be described further below. The pillar assembly 10 may also include a trim panel 82 and an inflatable curtain 84. The trim panel 82 may be formed from a rigid material that includes an inner surface 86 and an outer surface 88, such that the outer surface 88 may include a fabric covering 90. The outer surface 88 may provide the trim panel 82 with an aesthetic appearance depending on the various colors and materials that may be used for the fabric covering 90. Additionally or alternatively, the outer surface 88 of the trim panel 82 may be formed from a polymeric material or other generally rigid material.

The inflatable curtain 84 is disposed between the trim panel 82 and the pillar frame 14, such that the inflatable curtain 84 may be coupled to the pillar frame 14 via the bracket 80 and covered by the trim panel 82. The inflatable curtain 84 may also be referred to as a curtain airbag and is configured to deploy from a storage position 92 (FIG. 6), described below, based upon the application of a predetermined level of force. The inflatable curtain 84 may include a retention strap 94, which may be coupled to the attachment tab 22 of the bracket 80 via a pliable fastener 96, described further below. The retention strap 94 may be flexible, such that the inflatable curtain 84 is retained in the storage position 92 (FIG. 6) until the application of the predetermined level of force.

With further reference to FIGS. 3 and 4, it is generally contemplated that the pillar frame 14 may, at least in part, be formed from sheet metal, such as steel. The pillar frame 14 defines first and second holes 98, 100 through which fasteners 102 extend to couple the bracket panel 20 to the pillar frame 14. The fasteners 102 may be nut and bolt fasteners, rivets, and other generally known fasteners in the art. The pillar assembly 10 may also include hoses 104 and electrical wiring 106, which may be respectively coupled to the upper and lower retention features 26, 32, described below. It is generally contemplated that the hoses 104 may be used to direct washer fluid for windshield wipers 108 (FIG. 1). The electrical wiring 106 may be housed in an insulated tube 110, which is retained by the bracket 80, described further below. The electrical wiring 106 may be utilized to provide electrical connections for the overhead console 112 (FIG. 2) and/or lights 114 disposed within the vehicle 12 (FIG. 1).

Figure 5:
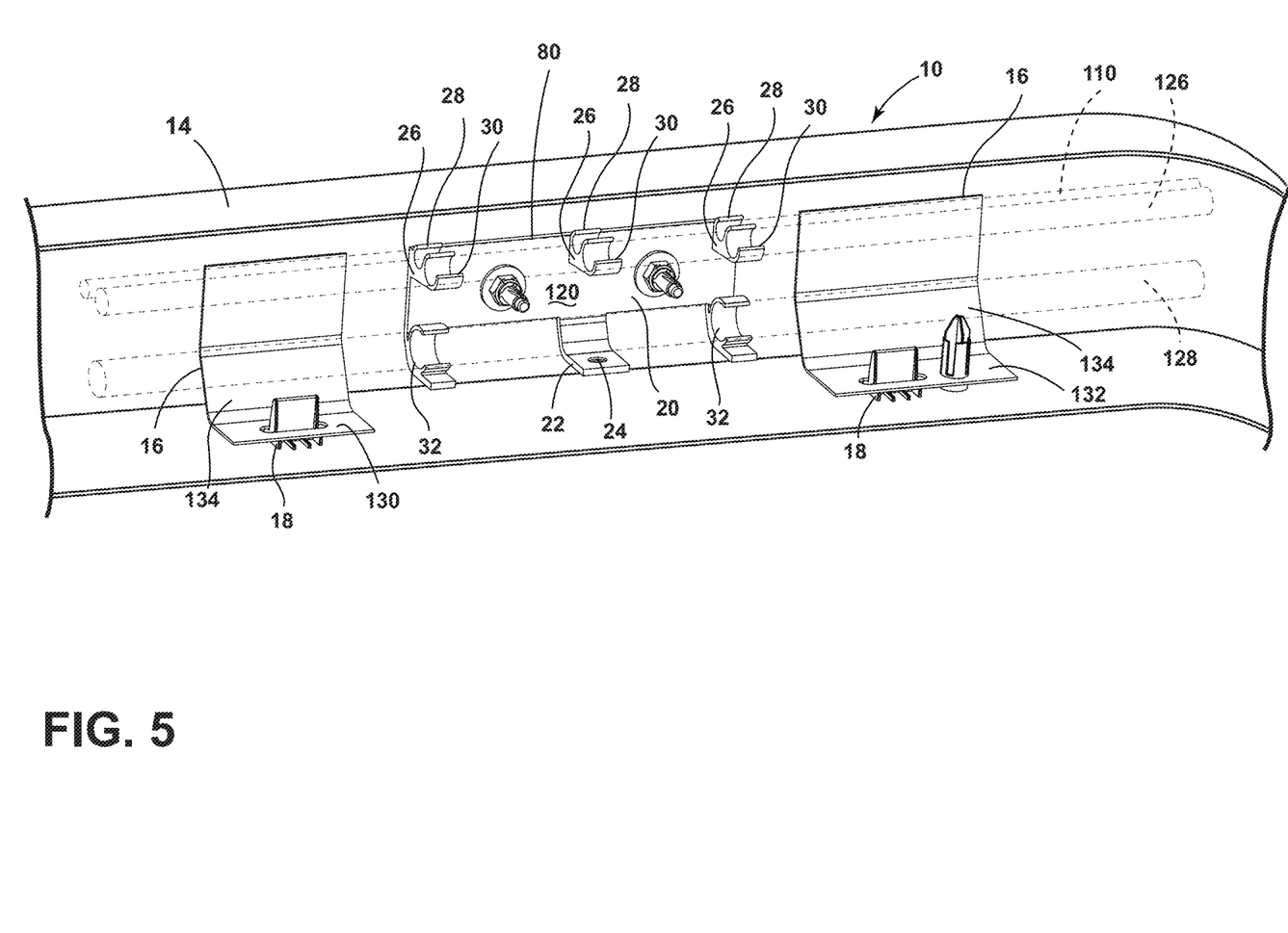
FIG. 5 is a top perspective view of a bracket between first and second trim brackets of the present disclosure.
Figure 6:
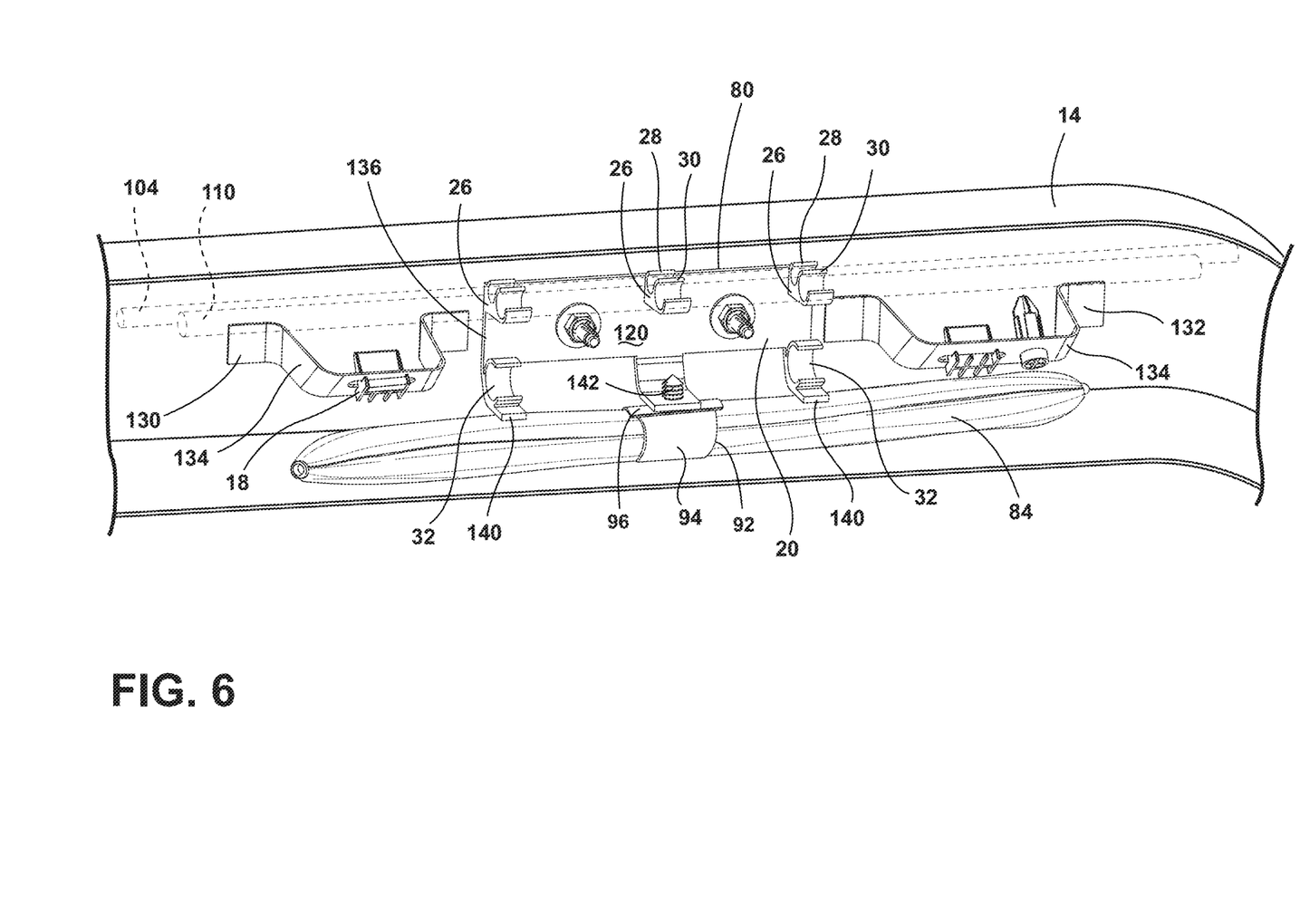
FIG. 6 is a top perspective view of an inflatable curtain coupled to a bracket of the present disclosure.

As illustrated in FIGS. 5 and 6, the insulated tube 110 that houses the electrical wiring 106 (FIG. 3) may be coupled to the upper retention features 26 and/or the lower retention features 32. Additionally or alternatively, the hoses 104 may also be coupled to the upper retention features 26 and/or the lower retention features 32. By way of example, not limitation, one of the hoses 104 is illustrated as being coupled to the first retention feature 28 of each of the upper retention features 26, and the insulated tube 110 is illustrated as being coupled to the second retention feature 30 of each of the upper retention features 26. It is also contemplated that the insulated tube 110 may be coupled to the first retention feature 28 and the hose 104 may be coupled to the second retention feature 30 depending on the various size configurations of each of the hoses 104 and the insulated tube 110.

Figure 7:
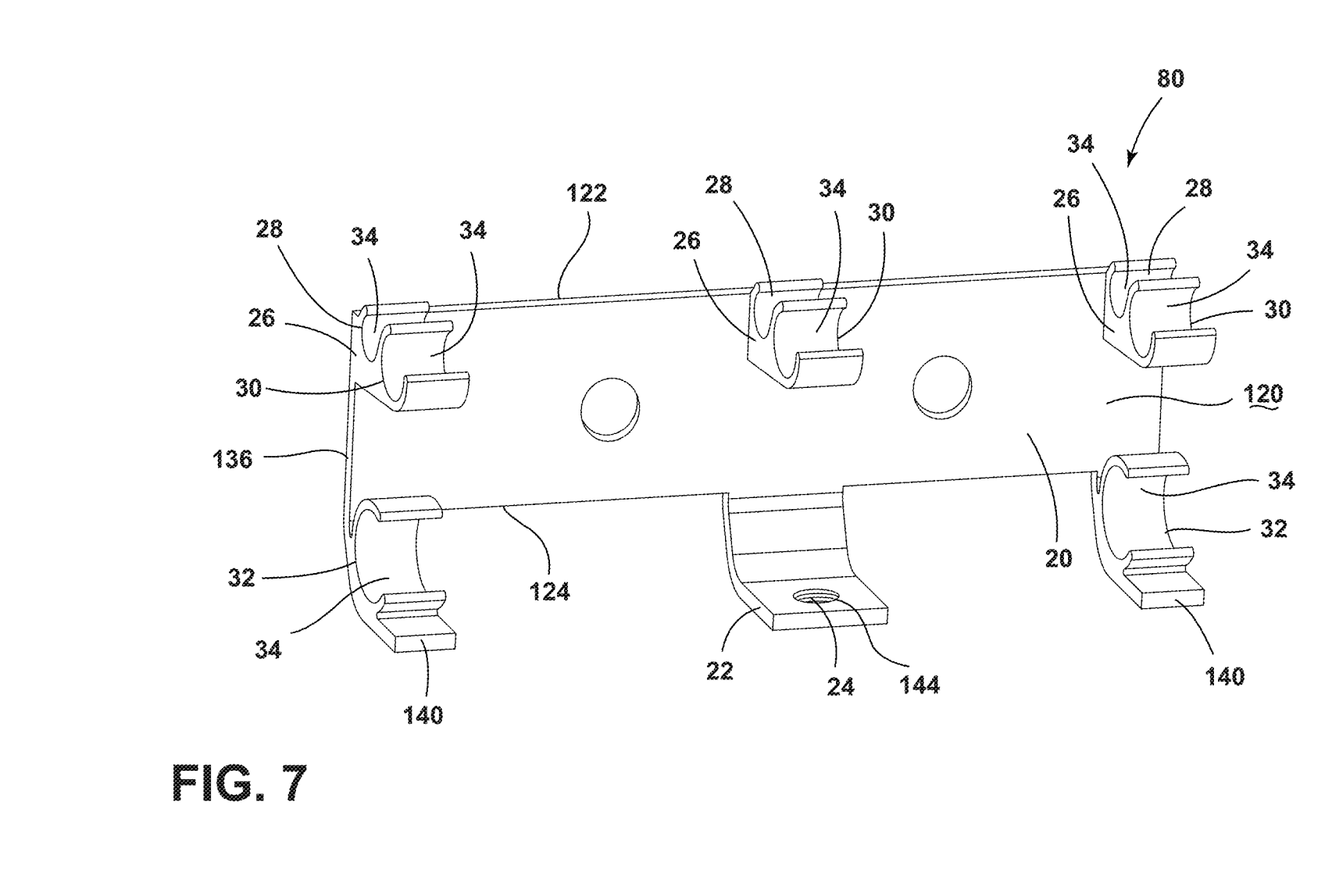
FIG. 7 is a front perspective view of a bracket of the present disclosure.

Referring to FIGS. 5-7 and as mentioned above, the bracket panel 20 is part of the bracket 80 for the pillar assembly 10. The bracket panel 20 may also be referred to as a panel and includes a face 120 that is defined by an upper edge 122 and a lower edge 124. The upper retention features 26 are coupled to the upper edge 122 of the bracket panel 20, and the lower retention features 32 are coupled to the lower edge 124 of the bracket panel 20. It is also contemplated that the upper and lower retention features 26, 32 are integrally formed with the bracket panel 20, such that the bracket 80 may be a single, unitary formation with the bracket panel 20, the upper retention features 26, the lower retention features 32, and the attachment tab 22. It is generally contemplated that the bracket 80 may be formed from a polymeric material, such as plastic. However, it is also contemplated that the bracket 80 may be formed from other substantially rigid materials generally known in the art.

As illustrated in FIG. 5, the insulated tube 110 is coupled to the first retention feature 28, a first hose 126 is coupled to the second retention feature 30, and a second hose 128 is coupled to the lower retention features 32. Additionally or alternatively, the first hose 126 may be coupled to either the first retention feature 28 of the upper retention features 26 and/or the lower retention features 32, and the insulated tube 110 may be coupled to either the second retention feature 30 of the upper retention features 26 and/or the lower retention features 32. As mentioned above, the positioning of the hoses 104 and the insulated tube(s) 110 depends on the configuration of the vehicle 12 (FIG. 1). In addition, the number of hoses 104 and insulated tubes 110 depends on the configuration of the vehicle 12 (FIG. 1), such that the vehicle 12 (FIG. 1) may include more than two hoses 104, less than two hoses 104, or more than one insulated tube 110.

With further reference to FIG. 5, the at least one trim bracket 16 extends beneath the second hose 128. The at least one trim bracket 16 may include a first trim bracket 130 and a second trim bracket 132. The bracket 80 may be disposed between the first trim bracket 130 and the second trim bracket 132. Each of the first and second trim brackets 130, 132 includes a body 134 to which the fastening feature 18, as mentioned above, is coupled. The first and second trim brackets 130, 132 are coupled to the pillar frame 14 and are configured to couple the trim panel 82 (FIG. 3) to the pillar frame 14 via the fastening feature 18. In this configuration, the first and second trim brackets 130, 132 extend below the bracket 80 to minimize potential interference with the second hose 128, as illustrated in FIG. 5. In such configuration, the bracket 80 retains the first and second hoses 126, 128 in addition to the insulated tube 110, with the second hose 128 extending across the attachment tab 22 and coupled to the lower retention features 32. Stated differently, the fastening features 18 of the first and second trim brackets 130, 132, as illustrated in FIG. 5, are positioned beneath the lower retention features 32 to accommodate the second hose 128 while also operably coupling the trim panel 82 (FIG. 3).

In an alternative configuration illustrated in FIG. 6, the body 134 of each of the first and second trim brackets 130, 132 has a generally U-shaped construction the first and second trim brackets 130, 132 are generally coupled to the pillar frame 14 proximate to a central portion 136 of the bracket panel 20. As illustrated, the first and second trim brackets 130, 132 may extend from the pillar frame 14 at an angle and extend past the face 120 of the bracket panel 20. By way of example, not limitation, the fastening features 18 illustrated in FIG. 6 may generally be positioned proximate to the lower retention features 32. In this alternate configuration, a single hose 104 is coupled to the first retention features 28 of the upper retention features 26, and the insulated tube 110 is coupled to the second retention features 30 of the upper retention features 26. Additionally or alternatively, multiple hoses 104 may be used and coupled to the first and second retention features 28, 30 and/or multiple insulated tubes 110 may be coupled to the first and second retention features 28, 30 depending on the vehicle 12 (FIG. 1) configuration.

With further reference to FIGS. 6 and 7, the lower retention features 32 each include a planar engagement surface 140 that outwardly extends from each lower retention feature 32. As mentioned above, the attachment tab 22 of the bracket 80 defines the attachment aperture 24, which is configured to couple the inflatable curtain 84 to the bracket 80. The retention strap 94 of the inflatable curtain 84 may be coupled to the bracket 80 via the pliable fastener 96, such as a bungee clip. The pliable fastener 96 may be coupled to the retention strap 94 of the inflatable curtain 84 to selectively release the inflatable curtain 84 from the storage position 92.

The pliable fastener 96 is coupled to the bracket 80 via the aperture 24 defined by the attachment tab 22. For example, the pliable fastener 96 may include a threaded shaft 142, such that the aperture 24 may define corresponding threads 144. The threaded shaft 142 of the pliable fastener 96 may operably and threadably couple to the threads 144 defined within the aperture 24 of the attachment tab 22. The pliable fastener 96 may also include a pliable body 145 that is selectively and operably coupled to the retention strap 94 of the inflatable curtain 84. As mentioned above, the inflatable curtain 84 may be released upon the application of a predefined force. Typically the pliable body 145 may bend and flex with potential movement of the inflatable curtain 84 as a result of typical vehicular movement. As such, the planar engagement surface 140 of the lower retention features 32 may engage the inflatable curtain 84 in the storage position 92 to generally retain the inflatable curtain 84 beneath the bracket 80 during general vehicular movement. Upon the application of the predefined force, the inflatable curtain 84 will be released from the retention strap 94 and the pliable body 145.

Figure 8:
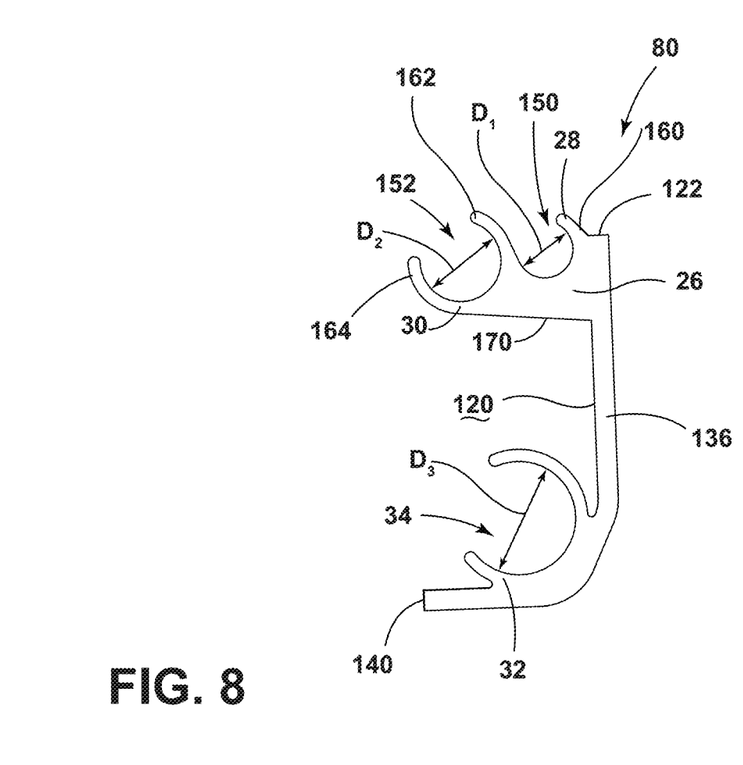
FIG. 8 is a side elevational view of the bracket of FIG. 7.

Referring now to FIGS. 7 and 8, the bracket 80 is illustrated with the upper retention features 26 and the lower retention features 32. As mentioned above, the upper retention features 26 each include the first retention feature 28 and the second retention feature 30. The upper retention features also include portion 160, a second portion 162, a third portion 164 and a protruding edge 170. The first portion 160 and the second portion 162 define the first retention feature 28. The second portion 162 and the third portion 164 define the second retention feature 30. The first retention feature 28 is offset from the protruding edge 170 a distance greater than the second retention feature 30 is offset from the protruding edge 170, as illustrated. The first retention feature 28 defines a first annular recess 150, and the second retention feature 30 defines a second annular recess 152. It is generally contemplated that the first annular recess 150 has a diameter D1 that is smaller or less than a diameter D2 of the second annular recess 152 defined by the second retention feature 30. Additionally, it is generally contemplated that a diameter D3 of the lower retention features 32 is greater than the diameters D1, D2 of the upper retention features 26. As illustrated, the diameter D3 of the lower retention features 32 is greater than the diameters D1, D2 of both the first retention features 28 and the second retention features 30, respectively. Stated differently, the annular recess 34 of the lower retention features 32 includes a diameter D3 that is greater than the diameter D2 of the annular recesses 34. Thus, the bracket 80 may be used to retain hoses 104 (FIG. 6) of various sizes and/or the insulated tubes 110 (FIG. 6) for the electrical wiring 106 (FIG. 3) of various sizes.

Referring again to FIGS. 1-8, the bracket 80 of the pillar assembly 10 may provide many benefits to the overall construction of any one of the A-pillar 58, the B-pillar 60, the C-pillar 62, and/or the D-pillar 64. The construction of the upper retention features 26 in the lower retention features 32 of the bracket 80 provides a variety of options for various configurations, which may depend on the vehicle 12 construction. For example, the varying diameters $D_1, D_2, D_3$ of the upper retention features 26 and the lower retention features 32 provide optional variations regarding the size of hoses 104 and/or insulated tubes 110 that may be utilized with the bracket 80. Moreover, the incorporation of three various sized retention features, 28, 30, 32 maximizes the number and variations of hoses 104 and electrical wiring 106 that may be used in the vehicle 12.

In addition, the attachment tab 22 being integrally formed or coupled to the bracket panel 20 further provides the optional attachment of the inflatable curtain 84 to the bracket 80. The pliable fastener 96 may be used, to couple the inflatable curtain 84 to the bracket 80 and the planar engagement surfaces. 104, along with the attachment tab 22 may generally retain the orientation of the inflatable curtain 84 within the pillar assembly 10 during typical vehicular movement. The optional configuration of attaching the inflatable curtain 84 to the bracket 80 minimizes the use of a separate attachment bracket to retain the inflatable curtain 84 within the pillar assembly 10. In addition, the bracket 80 described herein may be used with a variety of trim bracket 16 configurations, such that the trim bracket 16 may vary, while still being used with the bracket 80 described herein. This universal use of the bracket 80 minimizes the overall cost of production and maximizes the use of a single bracket within the pillar assembly 10.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A pillar assembly, comprising:
a pillar frame;
at least one trim bracket coupled to the pillar frame, the at least one trim bracket including a fastening feature;
a bracket panel coupled to the pillar frame and disposed proximate to the at least one trim bracket;
an attachment tab defining an aperture and coupled to the bracket panel;
upper retention features coupled to the bracket panel, each upper retention feature including a first retention feature, a second retention feature, a first portion, a second portion, a third portion, and a protruding edge, wherein the first retention feature and the second retention feature are both defined at least by the second portion, wherein the first retention feature is offset from the protruding edge a distance greater than the second retention feature is offset from the protruding edge, wherein the first retention feature upwardly opens, wherein the second retention feature upwardly opens, and wherein the first retention feature abuts the bracket panel; and
lower retention features coupled to the bracket panel and adjacent to the attachment tab, wherein the upper retention features and the lower retention features define annular recesses, and wherein the lower retention features laterally open.

2. The pillar assembly of claim 1, wherein the first retention feature defines a first annular recess and the second retention feature defines a second annular recess.

3. The pillar assembly of claim 1, wherein the annular recesses of the lower retention features have a diameter that is greater than the diameter of the annular recesses of the upper retention features.

4. The pillar assembly of claim 1, further comprising:
a fastener disposed within the aperture of the attachment tab and coupled to the attachment tab; and
an inflatable curtain operably coupled to the fastener and selectively disposed in a storage position.

5. The pillar assembly of claim 1, wherein a diameter of the second retention feature of the upper retention features is greater than a diameter of the first retention feature of the upper retention feature.

6. The pillar assembly of claim 1, wherein the first retention features and the second retention feature of the upper retention features are integrally formed.

7. The pillar assembly of claim 1, wherein the bracket panel has an upper edge and a lower edge, and wherein the upper retention features are coupled to the upper edge and the lower retention features are coupled to the lower edge.

8. A bracket for a vehicle pillar, comprising:
a panel having a face defined by an upper edge and a lower edge;
an attachment tab coupled to and outwardly extending from the panel;
upper retention features coupled to the panel, wherein each of the upper retention features includes a first retention feature, a second retention feature, a first portion, a second portion, a third portion, and a protruding edge, wherein the first retention feature and the second retention feature are both defined at least by the second portion, wherein the first retention feature is offset from the protruding edge a distance greater than the second retention feature is offset from the protruding edge, wherein the first retention feature upwardly opens, wherein the second retention feature upwardly opens and wherein the first retention feature abuts the bracket panel; and
lower retention features coupled to the panel and adjacent to the attachment tab, wherein each of the upper retention features and each of the lower retention features defines an annular recess, and wherein the lower retention features laterally open.

9. The bracket of claim 8, wherein the first retention feature defines a first annular recess and the second retention feature defines a second annular recess, and wherein the second annular recess has the diameter that is greater than the diameter of the first annular recess.

10. The bracket of claim 8, wherein the upper retention features outwardly extend from the face of the panel proximate to the upper edge of the panel.

11. The bracket of claim 8, wherein each of the lower retention features includes a planar engagement surface.

12. The bracket of claim 8, wherein each of the lower retention features defines an annular recess.

13. The bracket of claim 8, wherein the upper retention features outwardly extend from the upper edge of the panel, and wherein the lower retention features outwardly extend from the lower edge of the panel.

14. A vehicle pillar bracket, comprising:
a bracket panel having a face at least partially defined by an upper edge and a lower edge of the bracket panel;
upper retention features coupled to the bracket panel, each upper retention feature including a first retention feature, a second retention feature, a first portion, a second portion, a third portion, and a protruding edge, wherein the first retention feature and the second retention feature are both defined at least by the second portion, wherein the first retention feature is offset from the protruding edge a distance greater than the second retention feature is offset from the protruding edge, wherein the first retention feature upwardly opens, wherein the second retention feature upwardly opens, and wherein the first retention feature abuts the bracket panel; and
lower retention features coupled to the bracket panel, wherein each of the upper retention features and each of the lower retention features defines an annular recess, and wherein the lower retention features laterally open.

15. The vehicle pillar bracket of claim 14, wherein the upper retention features and the lower retention features are integrally formed with the bracket panel.

16. The vehicle pillar bracket of claim 14, wherein the upper retention features outwardly extend from the face of the bracket panel.

17. The vehicle pillar bracket of claim 14, wherein the lower retention features outwardly extend from the lower edge of the bracket panel.

18. The vehicle pillar bracket of claim 14, wherein a diameter of the lower retention features is greater than the diameter of the upper retention features.

19. The vehicle pillar bracket of claim 14, further comprising:

an attachment tab coupled to the lower edge of the bracket panel proximate to the lower retention features.

* * * * *